US011100525B2

(12) United States Patent
Mead et al.

(10) Patent No.: US 11,100,525 B2
(45) Date of Patent: Aug. 24, 2021

(54) SYSTEM AND METHOD FOR INTELLIGENT DISCOUNT DISTRIBUTION BASED ON SUBSCRIBER TIER

(71) Applicants: James Mead, Las Vegas, NV (US); Pennie Mead, Las Vegas, NV (US); Gustavo Manuel Damil Marin, Point Roberts, WA (US)

(72) Inventors: James Mead, Las Vegas, NV (US); Pennie Mead, Las Vegas, NV (US); Gustavo Manuel Damil Marin, Point Roberts, WA (US)

( * ) Notice: Subject to any disclaimer, the term of this patent is extended or adjusted under 35 U.S.C. 154(b) by 0 days.

(21) Appl. No.: 16/586,954

(22) Filed: Sep. 28, 2019

(65) Prior Publication Data

US 2020/0027110 A1    Jan. 23, 2020

Related U.S. Application Data

(63) Continuation of application No. 15/355,004, filed on Nov. 17, 2016, now Pat. No. 10,467,644.

(60) Provisional application No. 62/264,304, filed on Dec. 7, 2015.

(51) Int. Cl.
*G06Q 30/02* (2012.01)
*G06Q 30/06* (2012.01)

(52) U.S. Cl.
CPC ..... *G06Q 30/0222* (2013.01); *G06Q 30/0239* (2013.01); *G06Q 30/0633* (2013.01)

(58) Field of Classification Search
CPC .......... G06Q 30/0222; G06Q 30/0239; G06Q 30/0633

USPC ........................................................ 705/14.23
See application file for complete search history.

(56) References Cited

U.S. PATENT DOCUMENTS

| 2010/0280960 | A1* | 11/2010 | Ziotopoulos | G06Q 30/0223 705/80 |
| 2012/0226573 | A1* | 9/2012 | Zakas | G06Q 30/0601 705/26.2 |
| 2012/0245988 | A1* | 9/2012 | Pace | G06Q 30/0283 705/14.25 |
| 2013/0066740 | A1* | 3/2013 | Ouimet | G06Q 30/02 705/26.7 |

FOREIGN PATENT DOCUMENTS

JP    2003067850 A  *  3/2003

OTHER PUBLICATIONS

Zuora content team, 9 Keys To Building Successful Subscription Business Models, 2014 (Year: 2014).*

* cited by examiner

*Primary Examiner* — Tarek Elchanti
(74) *Attorney, Agent, or Firm* — Marin Patents LLC; Gustavo Marin

(57) ABSTRACT

A system and method for operating a bundle-type checkout system incorporating subscription tiers, comprising a subscription manager that assigns subscription tiers to merchants, an offer manager that receives price offers from consumers and analyzes offers to compute bundle offers, a threshold calculator that calculates price discount thresholds and compares price discount values to offer values, and a discount optimization manager that calculates price discounts and determines acceptability of price offers, and a system and method for weighted discount distribution among subscription tiers.

16 Claims, 10 Drawing Sheets

SYSTEM AND METHOD FOR INTELLIGENT DISCOUNT DISTRIBUTION BASED ON SUBSCRIBER TIER

CROSS-REFERENCE TO RELATED APPLICATIONS

This application is a continuation of U.S. Nonprovisional patent application Ser. No. 15/355,004, filed Nov. 17, 2016, entitled "SYSTEM AND METHOD FOR INTELLIGENT DISCOUNT DISTRIBUTION BASED ON SUBSCRIBER TIER," which claims the benefit of priority to U.S. Provisional Application No. 62/264,304, filed Dec. 7, 2015, entitled "SYSTEM AND METHOD FOR INTELLIGENT DISCOUNT DISTRIBUTION BASED ON SUBSCRIBER TIER" the entire contents of which are herein incorporated by reference.

BACKGROUND OF THE INVENTION

Field of the Art

The disclosure relates to the field of, and more particularly to the field of distributing weighted discount to merchants based on subscription tier in a bundled checkout scenario.

Discussion of the State of the Art

In the art of electronically purchasing products, it is common to allow consumer to place an offer on items rather than pay a fixed price (for example, online product portal such as Amazon.com™, AliBaba™, AliExpress™). In such arrangements, buyers typically submit a "best offer" for an item that may have a fixed price, rather than paying the listed price. In such an arrangement, a merchant would then review offers either manually or automatically, and select buyers with whom to complete a sale. There is currently no platform for potential buyers to submit a number of offers on items from a plurality of merchants, using bundle-type pricing to make an offer on a group of items in an electronic shopping cart, and no means exist for merchants to easily configure bundle-type pricing or offer-acceptance rules for their stock. Furthermore, there is distinction between merchants. For example, merchants that may sell a high volume of products do not have creative ways to reduce discount in a bundle-type product arrangement.

What is needed, is a means to enable buyers to easily submit a price offer on multiple items, and for merchants to easily compare a received offer against configured discount and bundle thresholds to determine an optimum arrangement for an offer to maximize profit while appealing to buyers through discounted pricing. Further, what is needed is a means to distinguish between different service levels or discounts applied to different tier merchants based on subscription tier.

SUMMARY OF THE INVENTION

Accordingly, the inventor has conceived and reduced to practice, in a preferred embodiment of the invention, a system and methods for operating a checkout system incorporating bundle-type offer acceptance with subscription tiers for merchants to enable a weighted discount scenario to increase revenue of product sales.

According to a preferred embodiment of the invention, a system for operating a bundle-type checkout system incorporating subscription tiers, comprising a subscription manager comprising a plurality of programming instructions stored in a memory and operating on a processor of a computing device, and configured to assign a plurality of subscription values to a plurality of merchant users; an offer manager comprising a plurality of programming instructions stored in a memory and operating on a processor of a computing device, and configured to receive a plurality of price offers from a plurality of consumer users, and configured to analyze received offers to compute a plurality of bundle offers based at least in part on a portion of received offers; a threshold calculator comprising a plurality of programming instructions stored in a memory and operating on a processor of a computing device, and configured to calculate a plurality of price discount thresholds based at least in part on a subscription values, and configured to compare a plurality of price discount values to a plurality of offer values; and a discount optimization manager comprising a plurality of programming instructions stored in a memory and operating on a processor of a computing device, and configured to calculate a plurality of price discounts based at least in part on a merchant subscription level and based at least in part on a discount threshold, and configured to determine acceptability of a price offer based at least in part on an offer value and based at least in part on a price discount, is disclosed.

According to another preferred embodiment of the invention, method for operating a bundle-type checkout system incorporating subscription tiers, comprising the steps of assigning, using a subscription manager comprising a plurality of programming instructions stored in a memory and operating on a processor of a computing device, and configured to assign a plurality of subscription values to a plurality of merchant users, a subscription value to a merchant user; receiving, at an offer manager comprising a plurality of programming instructions stored in a memory and operating on a processor of a computing device, and configured to receive a plurality of price offers from a plurality of consumer users, and configured to analyze received offers to compute a plurality of bundle offers based at least in part on a portion of received offers, an offer from a consumer user; calculating, using a threshold calculator comprising a plurality of programming instructions stored in a memory and operating on a processor of a computing device, and configured to calculate a plurality of price discount thresholds based at least in part on a subscription values, and configured to compare a plurality of price discount values to a plurality of offer values, a discount threshold based at least in part on the subscription value; comparing the received offer to the price discount threshold; and determining, using a discount optimization manager comprising a plurality of programming instructions stored in a memory and operating on a processor of a computing device, and configured to calculate a plurality of price discounts based at least in part on a merchant subscription level and based at least in part on a discount threshold, and configured to determine acceptability of a price offer based at least in part on an offer value and based at least in part on a price discount, acceptability of the received offer, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
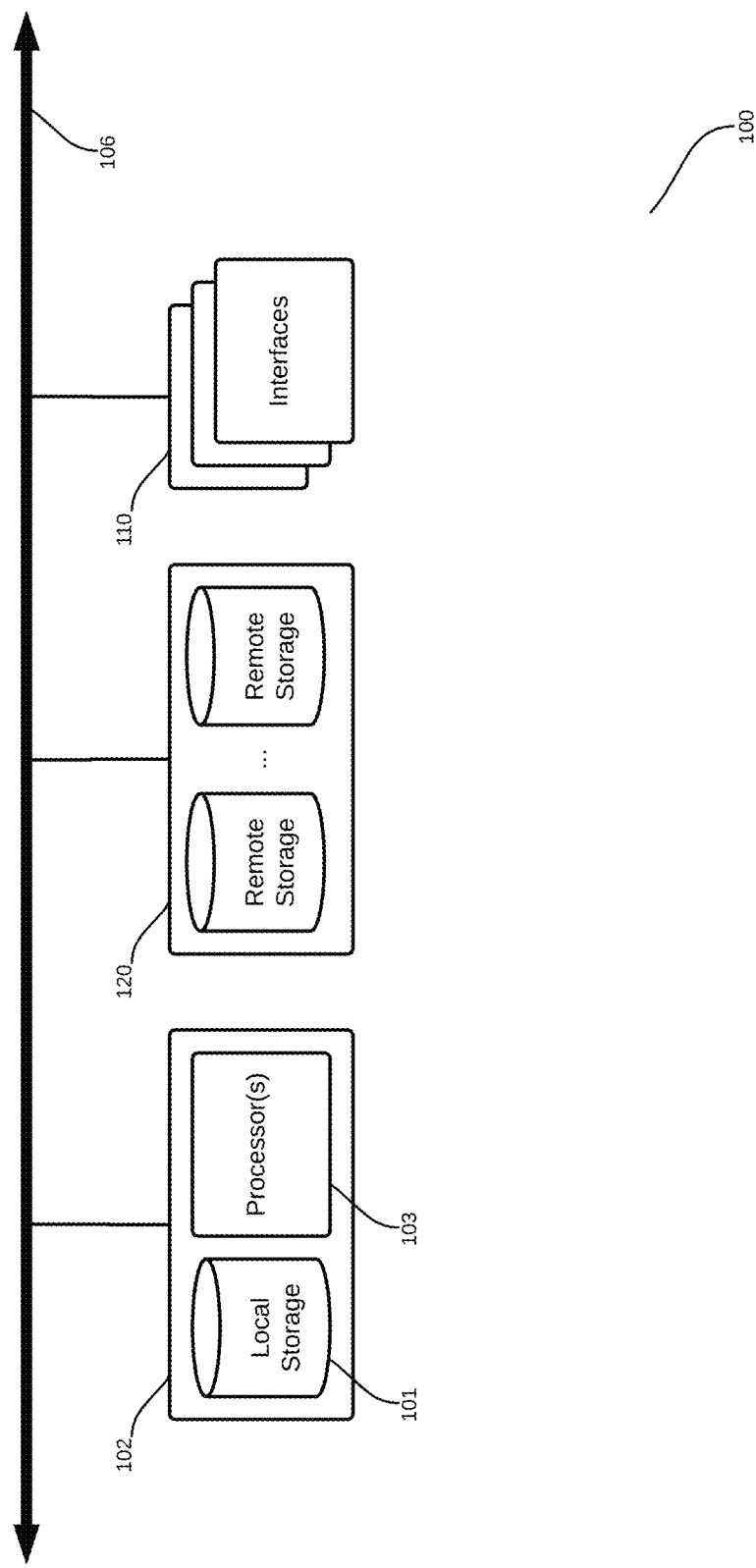
FIG. 1 is a block diagram illustrating an exemplary hardware architecture of a computing device used in an embodiment of the invention.

The inventor has conceived, and reduced to practice, in a preferred embodiment of the invention, a system and methods for operating a checkout system incorporating bundle-type offers with weighted discount distribution based on merchant subscription level.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in each embodiment or occurrence.

When a single device or article is described herein, it will be clear that more than one device or article may be used in place of a single device or article. Similarly, where more than one device or article is described herein, it will be clear that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
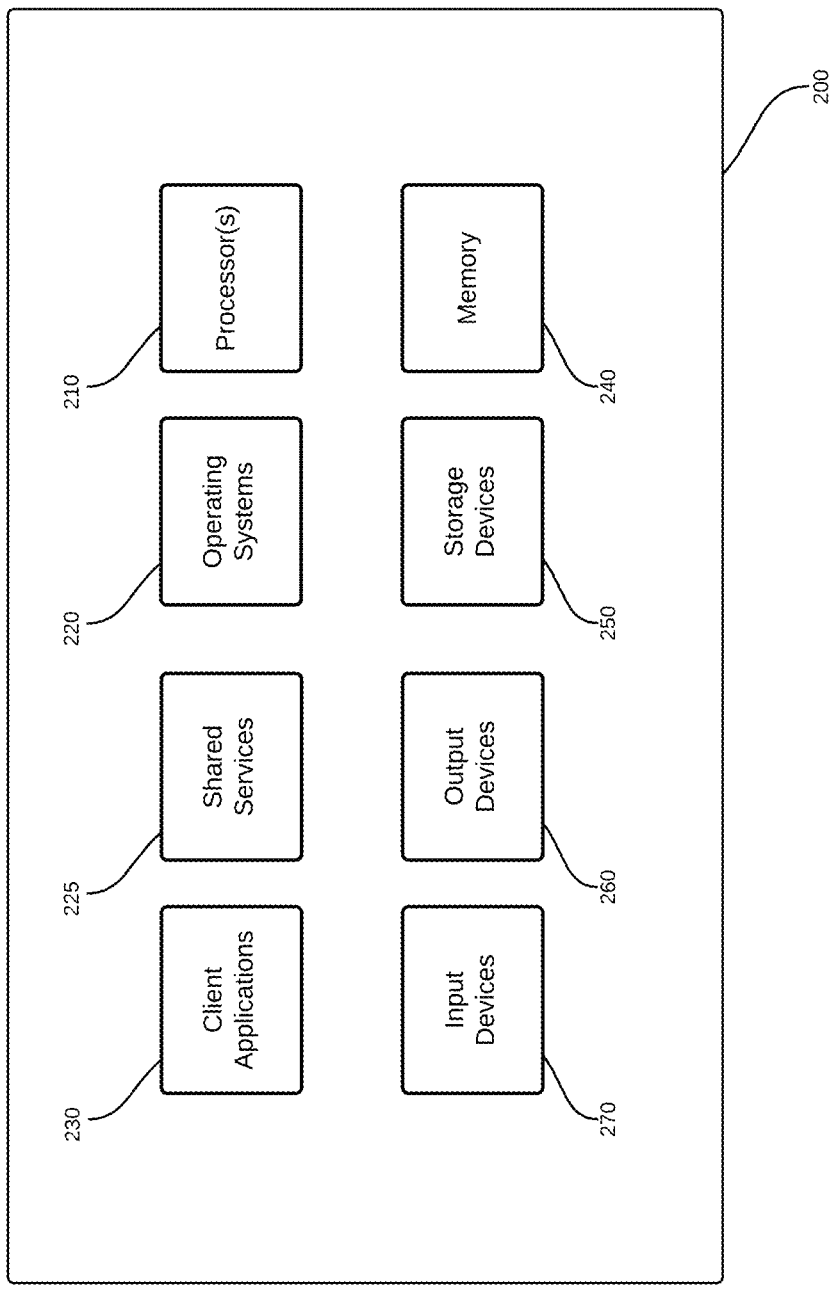
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
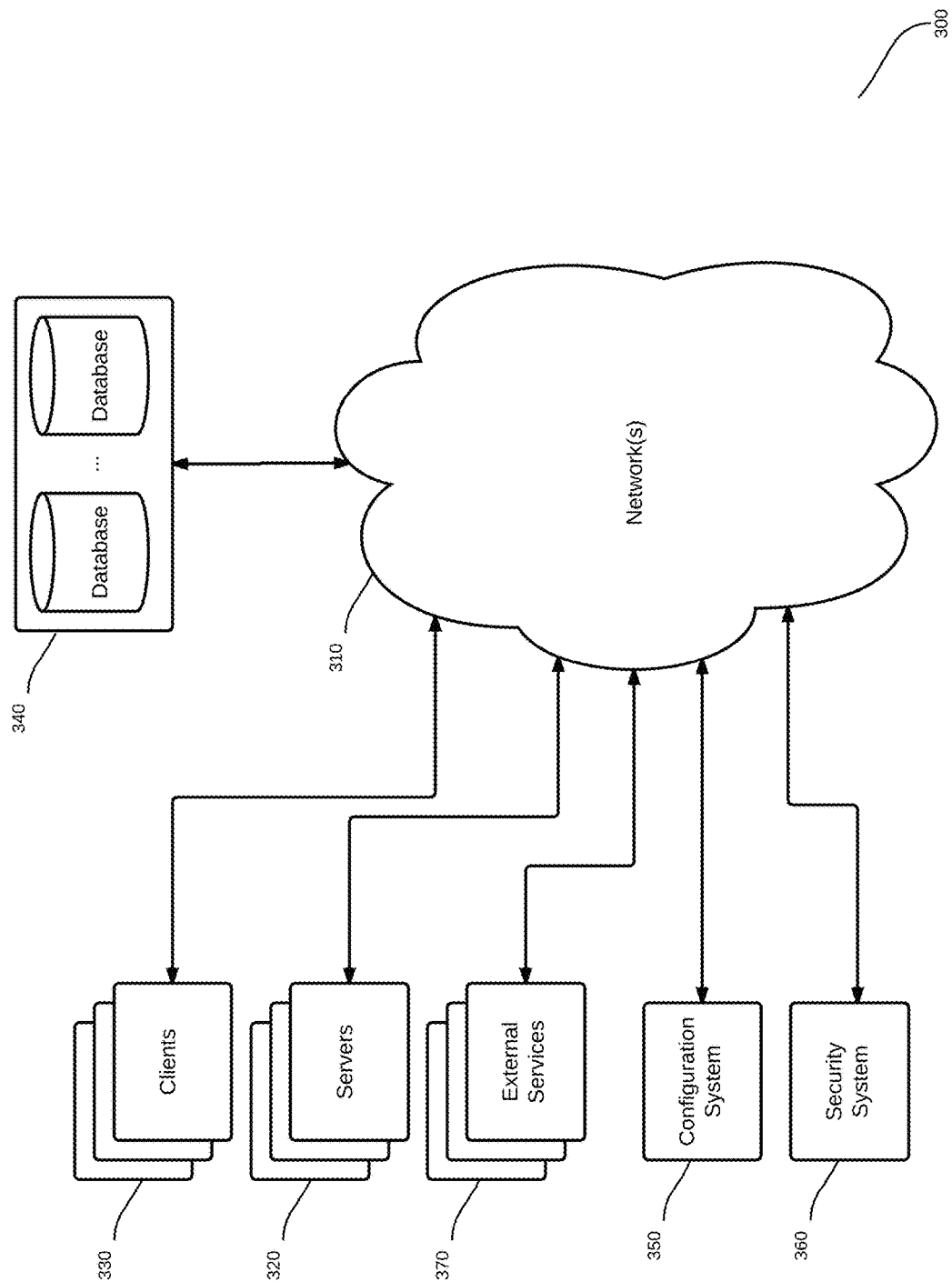
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310.

In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
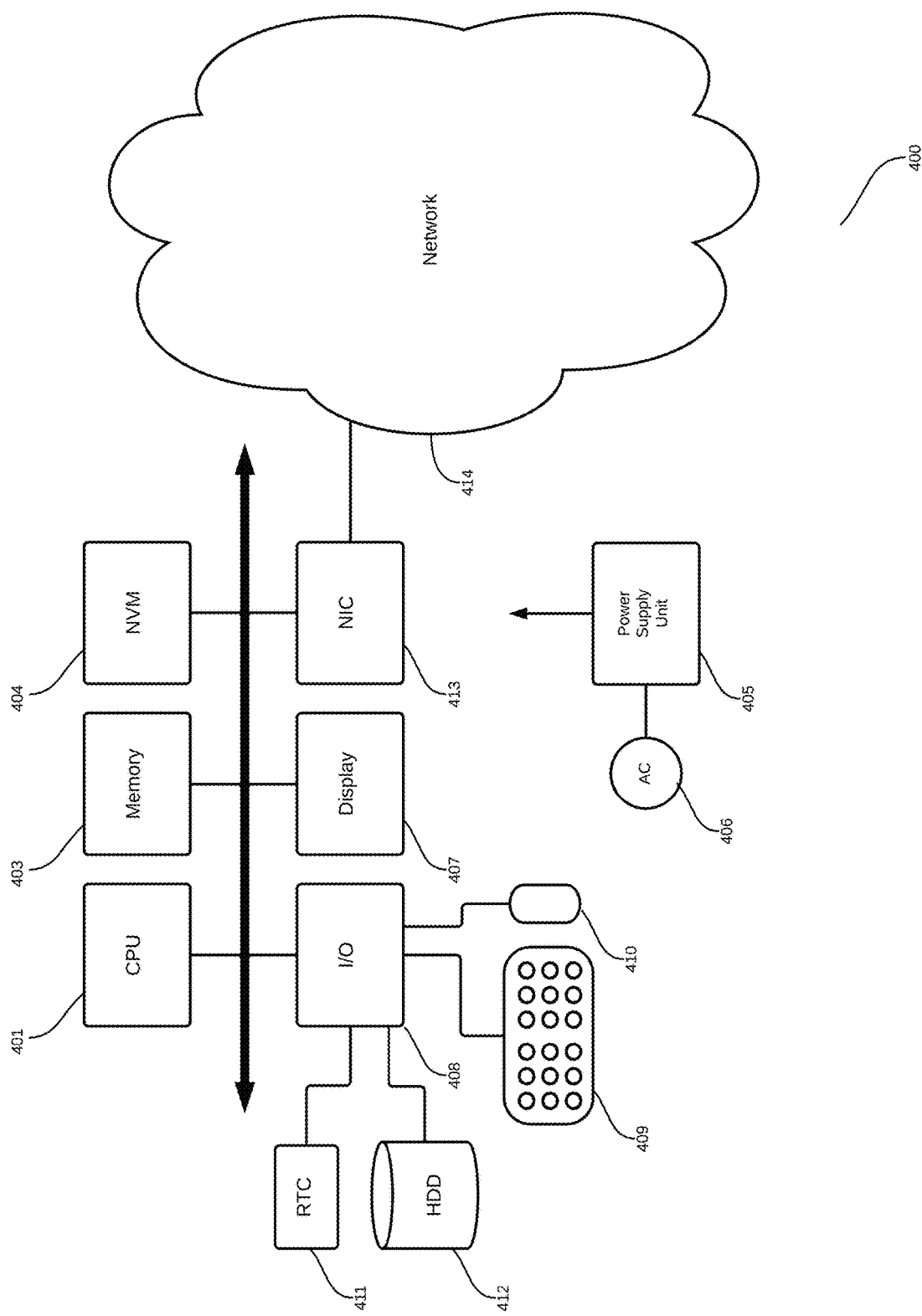
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also, shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
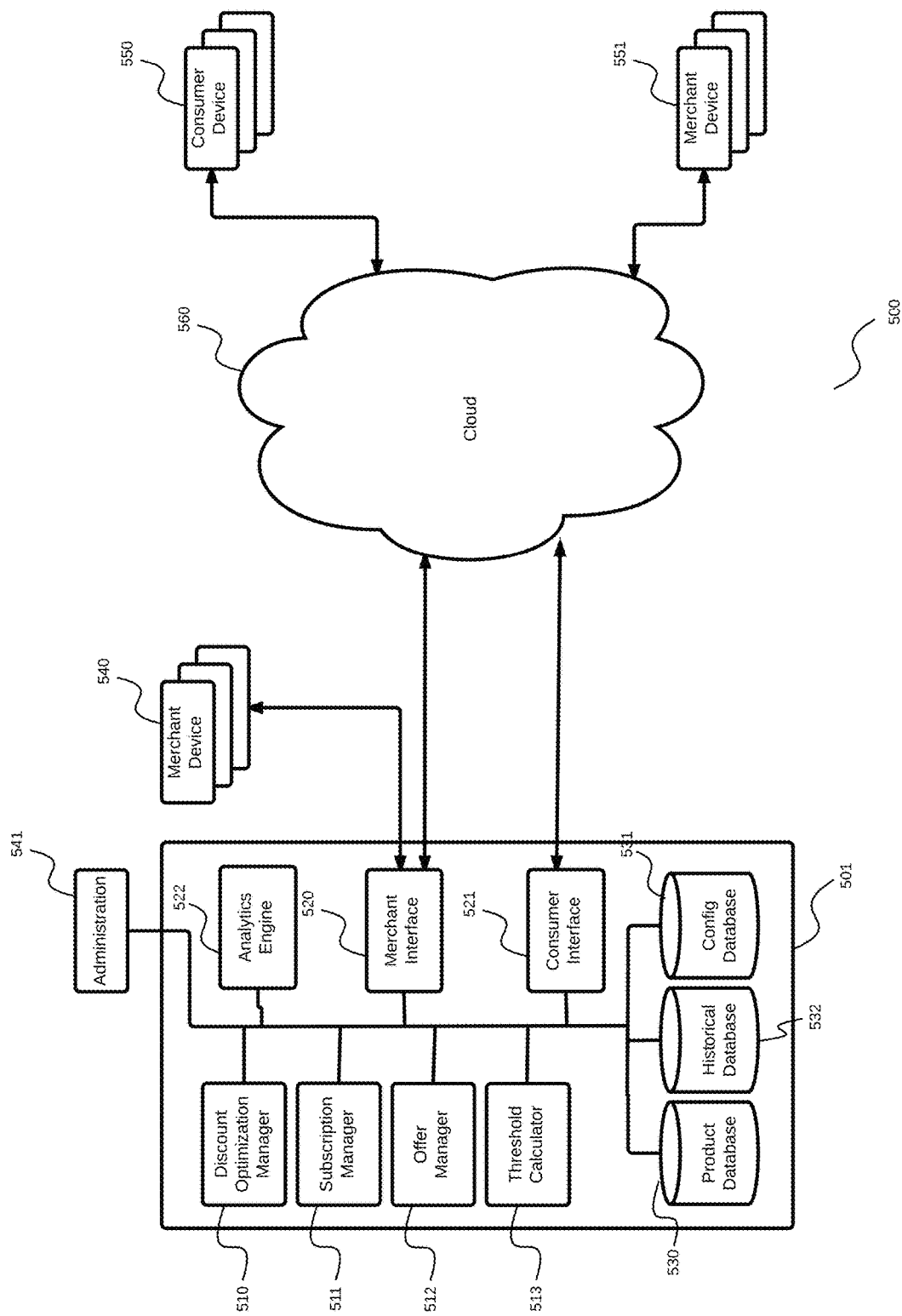
FIG. 5 is a block diagram of an exemplary system architecture for operating a bundle-type checkout system incorporating subscription tiers, according to a preferred embodiment of the invention.

FIG. 5 is a block diagram of an exemplary system architecture 500 for operating a bundle-type checkout system 501 incorporating subscription tiers, according to a preferred embodiment of the invention. According to the embodiment, a bundle-type checkout system 501 in communication with a plurality of client interfaces operating on a network (for example, a packet switched network, the internet, local area network (LAN), wide area network (WAN), or the like) such as a merchant interface 520 and consumer interface 521, that may each comprise a plurality of programming instructions stored in a memory and operating on a processor of a network-connected computing device, and may be configured to communicate via a network 560 such as the Internet or other data communication network. For example, merchant interface 520 may be configured to communicate via a cloud-based protocol to receive interactions from a plurality of merchant devices 551 via a network 560, such as to enable merchants to interact with a checkout system 501 via a web browser, another software application, or a specially programmed user computer, for example to configure operation of a particular checkout arrangement (such as an electronic storefront for a particular merchant), or to communicate with a plurality of merchant devices 540 via a local network connection such as a LAN operated by a merchant, or an internal data network operating on a merchant device. In some embodiments, merchant interface assigns a merchant device identifier to, for example merchants registering with system 501. In some embodiment, merchant interface 520 may receive, from a plurality of merchant devices 540, a plurality of product identifiers corresponding to products that a merchant may have for sale. Consumer interface 521 may be configured to communicate via a network with a plurality of consumer devices 550, for example via a software application operating on a plurality of consumer devices 550 or, for example, a plurality of specially programmed consumer computer 550. In some embodiments, consumers may communicate with system 501 via a web interface accessible via a browser application.

According to the embodiment, checkout system 501 may further comprise a plurality of data storage, for example a product database 530 that may be configured to store product identifiers and provide information pertaining to products such as pricing or inventory information, or a configuration database 531 that may be configured to store and provide configuration information for operating a bundle-type checkout system 501, such as merchant-specific pricing thresholds (as described below), and merchant subscription tiers. Historical database 532 may be configured to store (i) historical sales information outlining individual offer and sales information for product identifiers for completed sales in a bundle-type offer scenario, (ii) historical bundle offer and sales information for a plurality of bundles, (iii) unsuccessful offers by consumer devices 550, (iv) product identifiers by subscription tier (v) common bundle arrangements by a plurality of consumer devices 550, (vi) and the like. It can be appreciated by one with ordinary skill in the art that, in a preferred embodiment, any and all transaction in system 501 may be stored in historical database 532. Administration interface 541 provides an interface for the operator of system 501 to configure manage system 501, including but not limited to, configuring merchant devices 551 and consumer devices 550, configuring subscription tiers, analyzing historical sales and bundle information, setting thresholds, and other system configurations. Analytics engine 522 may provide a mechanism to analyze historical data to perform analysis on historical sales, bundles, retail price to discounted price deviations, and the like. In some embodiments analytics engine 522 may provide "what-if" scenarios to recalculate product sales if merchants were of different tiers to forecast sales differentials for subscription tiers for non-subscribing merchants, or a higher subscription tiers for lower subscribing merchants (for example where a higher subscription tier would enjoy a lesser discount on the merchant's products when possible). System 501 may further comprise a plurality of programming instructions configured to operate specific functions of system 501, such as including, for example, according to a preferred embodiment, a discount optimization manager 510 that may calculate merchant discounts according to configured parameters based on, for example, a merchant's subscription tier, in order to optimize a match with a plurality of consumer offers. Optimization manager 510 may calculate an available discount, and compare it to s requested discount to determine, for example, whether or not to accept an offer. In some embodiments, optimization manger may create a discount distribution matrix (as described in FIG. 10) to weight discounts provided to subscription tier merchant devices 551. A subscription manager 511 may configure membership levels or "subscription tiers" for merchants and define configuration parameters related to merchant tiers (such as default discount configuration, subscription-tier discount configuration, and the like). Administrator 541 may configure any number of subscription tiers via subscription manager 511. In some embodiments, subscription tiers may be dynamically created by discount optimization manager 510 based on historical product sales information, to optimize subscription tiers to maximize revenue for merchants and/or maximize revenue for the operator of system 501. An offer manager 512 may receive and manage bundle-type pricing offers from consumers for comparison, or a threshold calculator 513 may calculate comparisons between merchant discounts and consumer offers to determine suitability or allocation of funds after a purchase is made, for example according to allocation rules set by a subscription manager. Administration 541 may be used to configure the system and configuration stored in config database 531. Configuration may include, but not limited to, setting subscription tiers and associated discounts (as described in FIG. 10), configuring merchants, and other system configurations. Such functions are described in greater detail below, referring to FIGS. 6-10.

Detailed Description of Exemplary Embodiments

Figure 6:
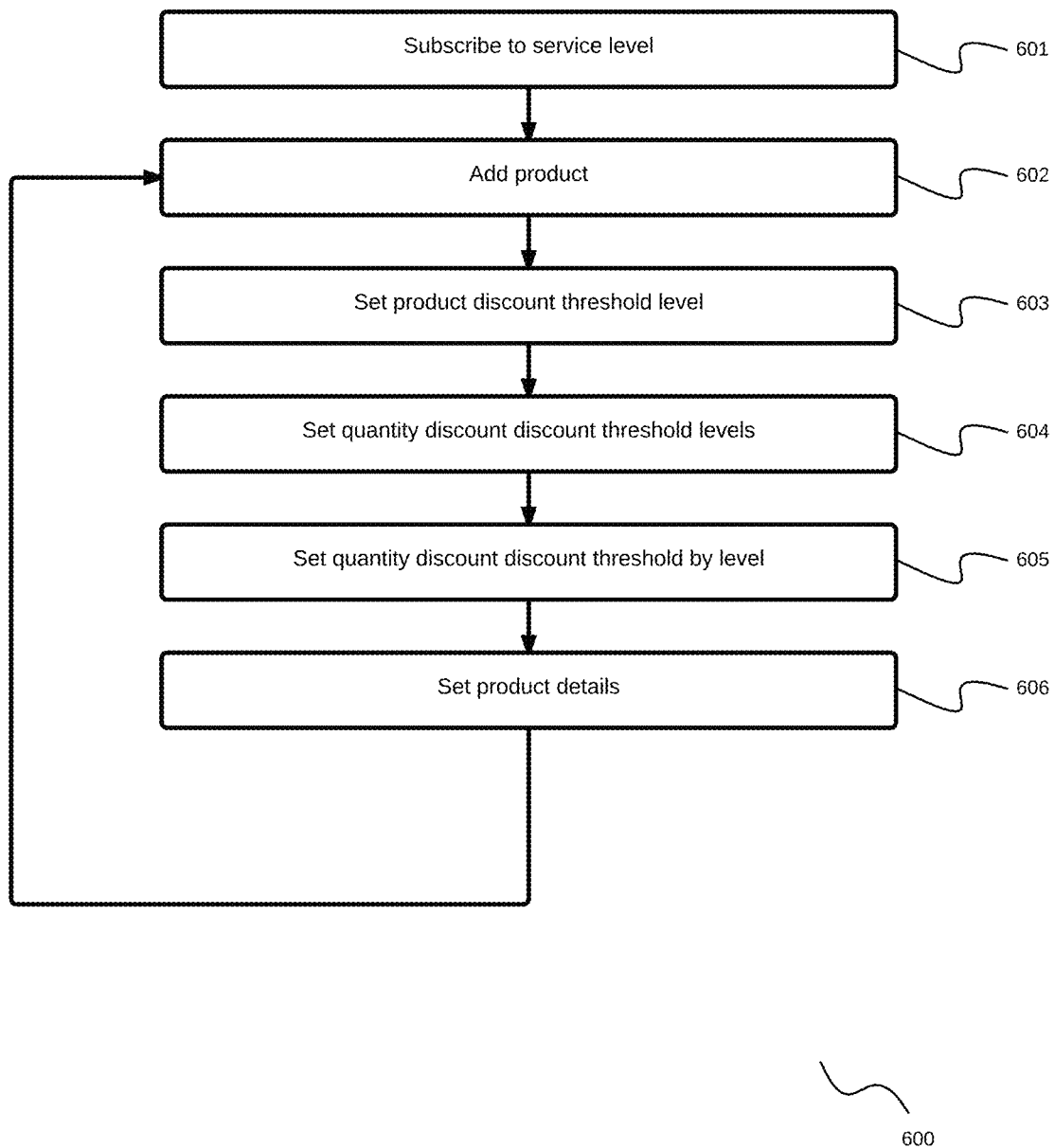
FIG. 6 is a flow diagram illustrating an exemplary method for operating a bundle-type checkout system incorporating subscription tiers, from the perspective of a participating merchant.

FIG. 6 is a flow diagram illustrating an exemplary method 600 for operating a bundle-type checkout system incorporating subscription tiers, from the perspective of merchant device 551. According to the embodiment, a merchant may elect, via merchant device 551, to participate in a bundle-type checkout system 501 incorporating subscription tiers, and may configure the particular nature of such a system to suit their preference according to the embodiment.

In an initial step 601, a merchant may subscribe to a service level, or "subscription tier". Service levels may be used to define pre-configured operation parameters, such as default pricing discount rules and algorithms used in comparing discounts to consumer offers. For example, a merchant subscribed to a "gold tier" may be entitled to a higher portion of a consumer's purchase price (based upon a consumer offers a higher price than the discount level set for a product identifier and/or bundle), whereas a merchant subscribed to a "bronze tier" may be entitled to a smaller portion or lower allocation priority (that is, they may only receive funds if there is a remaining surplus after first allocating to higher-tier merchants). In some embodiments, there is a non-subscriber tier, where full discounts will be offered before any discount is associated to product identifiers associated to subscriber tier merchant identifiers.

In a next step 602, a merchant via a first merchant device 551 may add a product identifier to their online storefront inventory, making the associated product available for purchase by a plurality of consumers via identifying the associated product identifier via a plurality of consumer devices 550. In a next step 603, the first merchant device 551 may set a product discount threshold level for use in comparing against the plurality of offers received from a plurality of consumer devices 550 (for example, by a threshold calculator described above, referring to FIG. 5), such as by using a preconfigured or default level set by their service level, or by specifying a discount of their choosing. For example, the merchant device 551 may designate to accept "up to 20% off" on a particular item, specifying that any consumer offers meeting at least 80% of the product's initial price value may be accepted via a first merchant device 551. In some embodiments, the merchant may establish, via first merchant device 551, a lowest acceptable offer (hereinafter referred to as "LAO") price for each individual product available for sale and associated to the corresponding product identifier. In this regard, threshold calculator 513 may assign a different LAO based on a quantity of a particular product identifier within a bundle selected by a first consumer device 550, for example, based on predefined threshold rules configured by threshold calculator 513. In another embodiment, a LAO price is calculated once a percentage discount is specified by a merchant via first merchant device 551. In a next step 604, the merchant, via first merchant device 551, may set automatic quantity discount threshold levels, for example to specify additional quantities that may be used as "bundles" when a consumer purchases multiples of the same item, or multiple items from the same merchant (for example, "buy 5 of this item" or "buy 3 items from this seller"). In a next step 605, the merchant, via first merchant device 551, may set quantity discount thresholds, for example to correspond to quantities set in a previous step 604. For example, the merchant, via first merchant device 551, may specify a discount rule of "purchase 5 of this item, get an extra 5% off", or discount thresholds that may be transparent to first consumer device 550, such as "accept offers of at least 75% if first consumer device 550 is requesting to purchase five or more items", or other such configurations. In this regard, for each discount threshold, a LAO will be calculated for each product identifier based on the threshold level. In a next step 606, the merchant, via first merchant device 551, may set product details such as various description for an item, for example technical specifications for electronics or appliances, or various descriptive text to be presented to a consumer while browsing via a first consumer device 550. Operation may continue in an iterative or looping fashion, repeating back at a previous step 602 and enabling the first merchant device 551 to continue configuring a plurality of additional items, discount thresholds, or quantity thresholds as desired.

In a preferred embodiment, a LAO for each product identifier may be dynamically changed with a LAO offset. The LAO offset automatically modifies the LAO for each consumer device 550 such that the plurality of consumer devices 550 will never receive the same LAO for a product identifier and/or bundle. It can be appreciated by one with ordinary skill in the art that in the circumstance where a consumer, via consumer device 550 may deduce an LAO for a product identifier and/or bundle, if she advertises the LAO to other users of system 501, the LAO will not be the same for other users, thus rendering the information inaccurate and thus maintaining the integrity and utility of bundle-type checkout system 501 incorporating subscription tiers. For example, a LAO offset may be calculated for first consumer device 550 using at least a location specific data combined with, for example, a time of day for a purchase made by first consumer device 550, combined with, for example, a temperature for the location of first consumer device 550. It should be appreciated that any information specific to first consumer device 550 may be useful in calculating an LAO offset. As such, a different LAO would be calculated for the same product identifier and/or bundle for every consumer device 500. In this regard, since second consumer device 550 which may be in another location or purchasing at another time-of-day than first consumer device 550, the LAO prices would appear to be seemingly random preventing any communication of LAOs for product identifiers and/or bundles by users of system 501.

Figure 7:
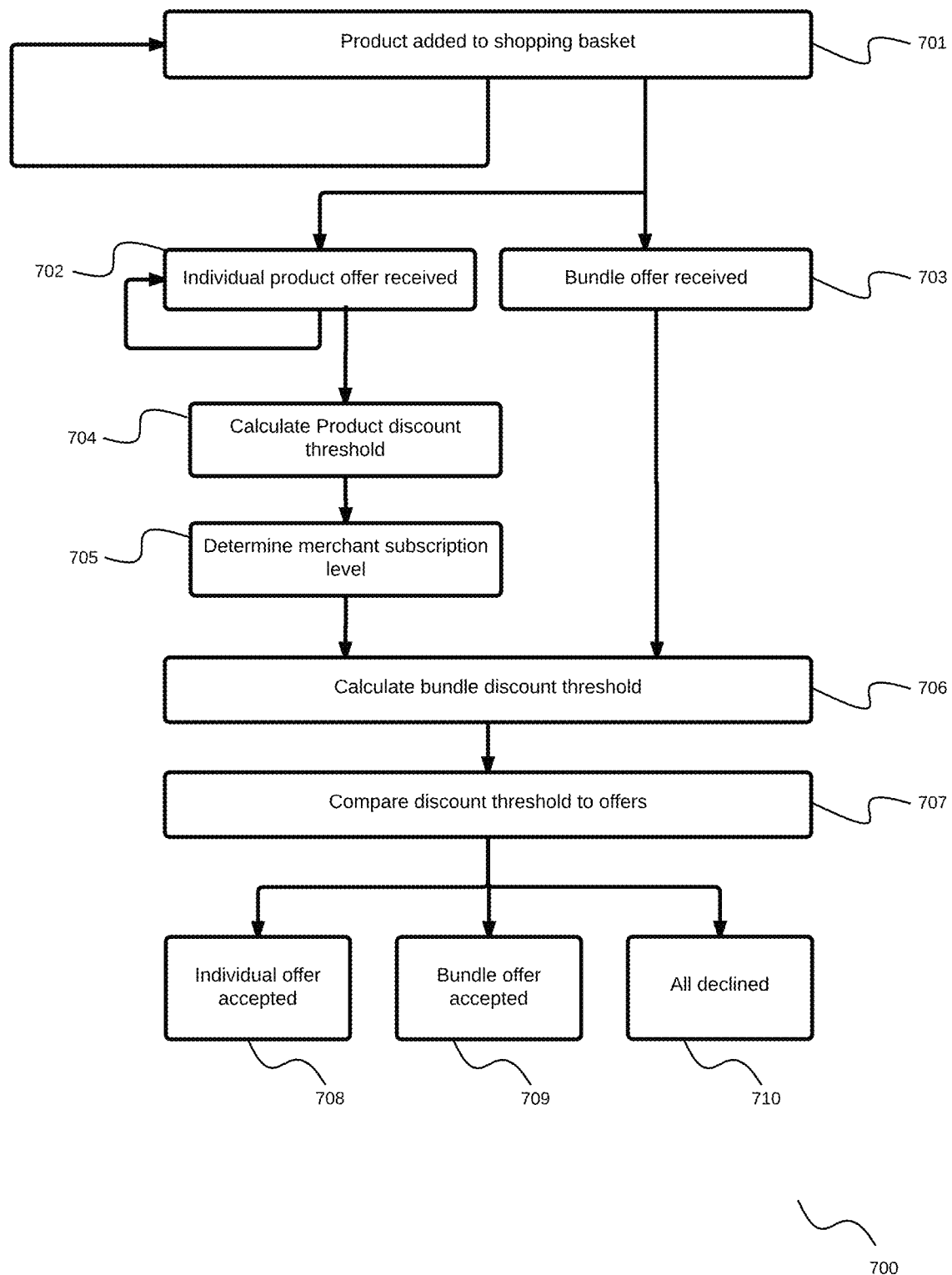
FIG. 7 is a flow diagram illustrating an exemplary method for operating a bundle-type checkout system incorporating subscription tiers, from the perspective of a first consumer.

FIG. 7 is a flow diagram illustrating an exemplary method 700 for operating a bundle-type checkout system incorporating subscription tiers, from the perspective of first consumer device 550. According to the embodiment, a consumer may browse and shop for items electronically via first consumer device 550 using familiar means, such as a mobile computing device or an online storefront being browsed via a web browser computer. When a particular merchant or storefront has been configured according to a bundle-type checkout system according to the embodiment, additional functionality may be available, and may be made optionally visible or transparent to first consumer device 550 according to a particular arrangement (for example, first consumer device 550 may not be informed of a product identifier's discount thresholds, or it may alternately be informed of specific discount thresholds or quantities to encourage purchasing by the user of first consumer device 550, according to a vendor's preference during configuration).

In an initial step 701, a consumer, via first consumer device 550, may add a product identifier to a digital "shopping basket", as is common in the art of electronic shopping. In a next step 702, an individual product offer may be received by a checkout system, for example if first consumer device 550 has added only a single item to their basket and made a purchase offer for that item. Additionally, first consumer device 550 may be used by a consumer to select a plurality of product identifiers to purchase as a bundle. If, for example, an offer is made, via first consumer device 550, on multiple items but no bundle thresholds are met, operation may continue looping as illustrated, producing individual product offers for each individual item. In an alternate step 703, a bundle offer may be received from first consumer device 550 by checkout system 501. Once a bundle is selected, a consumer may submit a single offer via first consumer device 550 to purchase the entire bundle. In a next step 704, threshold calculator 513 may calculate product discount thresholds corresponding to the product identifiers for which offers were received, and in a next step 705 subscription manager 511 may determine a subscription tier for merchants offering the products. For example, subscription tiers may be bronze, silver, and gold which, in this regard, may indicate levels of subscriptions that, for example, may have different subscription costs associated and distinct associated discount rules applied. For example, a merchant may become a bronze subscriber at a lower cost than a silver subscriber, which in-turn is a lower cost than a gold subscriber. In some embodiments, there may be product identifiers designated as non-member tier product identifiers where the merchant may not be subscribed to a subscription tier. In a next step 706, discount optimization manager 510 may calculate discount thresholds for items and bundles, taking into consideration a merchant's subscription tier to calculate an optimum discount for each item or bundle based on each participating merchant's subscription tier and configured discount thresholds. An exemplary process for calculating a weighted subscription tier discount is presented in FIG. 10. In a next step 707, calculated discount thresholds may be compared against received offers from first consumer device 550, to determine how to proceed. If an offer for an item meets or exceed a discount threshold for that item, the offer may be accepted in a final step 708. If an offer meets or is within a discount threshold for a bundle (for example, if an offer price for the entire shopping basket as a whole, i.e. the bundle, is received from first consumer device 550, and it exceeds a bundle threshold based on the items in their cart considered together as a bundle rather than as separate individual items), then the offer may be accepted in a final step 709. If an offer exceeds any thresholds for items or bundles, it may be declined in a final step 710, resulting in the items and/or bundle not being available for purchase, optionally with a notification to first consumer device 550, for example by sending a notification to first consumer device 550 that the offer is not accepted for the item(s) and/or bundle in question. In some embodiments, first consumer device 550 may be given an opportunity to submit a new offer as may be appropriate. In another embodiment, the amount of offers available to first consumer device 550 may be limited by offer manager 512. For example, after three declined offers, the system may not allow first consumer device 550 to place additional offers, for example, for (i) product identifiers within the bundle, (ii) the bundle itself, (iii) until a pre-defined period of time has passed, or (iv) a combination of these. In some embodiments, an entirely new LAO is calculated for the product identifiers and/or bundle where different offers may be accepted or declined in certain circumstances. It should be appreciated that other restrictions may be placed on product identifiers and/or bundles when an offer is declined.

Figure 8:
FIG. 8 is an illustration of an exemplary graphical user interface for a bundle-type shopping cart incorporating product bundles, illustrating the use of bundled price offers.

FIG. 8 is an illustration of an exemplary graphical user interface 800 for a bundle-type checkout system incorporating subscription tiers, showing the use of bundled price offers. According to the embodiment, a consumer who may be shopping electronically may select an item 801, via first consumer device 550, to an electronic shopping cart, and may continue selecting additional items 802, 803. After adding a final item 803 to a shopping cart, a consumer may choose to "checkout" and complete a sale, first consumer device 550, for the selected items. According to the embodiment, during checkout, first consumer device 550 may be prompted to submit a price offer 810 for the bundle. For example, as illustrated first consumer device 550 may have a variety of items in their cart such as furniture, household goods, appliances, or other products. An offer 810 may be submitted via first consumer device 550 for the bundle as a whole, which may cover their entire shopping cart as illustrated. In such an arrangement, offer 810 may be a single price offered for all items within the bundle, and if accepted by offer manager 512 (either manually or automatically, such as by comparison and matching against configured price thresholds as described previously), will result in a successful purchase for all included items in the bundle. In some embodiments, the product identifiers in the bundle are from a plurality of merchants previously configured through a plurality of merchant devices 551 wherein each merchant may be subscribed to a subscription tier further wherein the product identifiers associated to each merchant may enjoy a smaller discount applied to their respective product identifiers as described in FIG. 10 (that is, if the proportional offer for product identifiers belonging to subscribed merchant is above the collective LAO, the product identifiers belonging to subscribed merchants may be discounted at a lesser amount than product identifiers from merchant who may not have no subscription tier. Accordingly, the consumer, via first consumer device 550, may then select to preview and confirm their offer, generally via interactive interface indicia such as, for example, a "preview my deal" button 820 or other interactive means.

Figure 9:
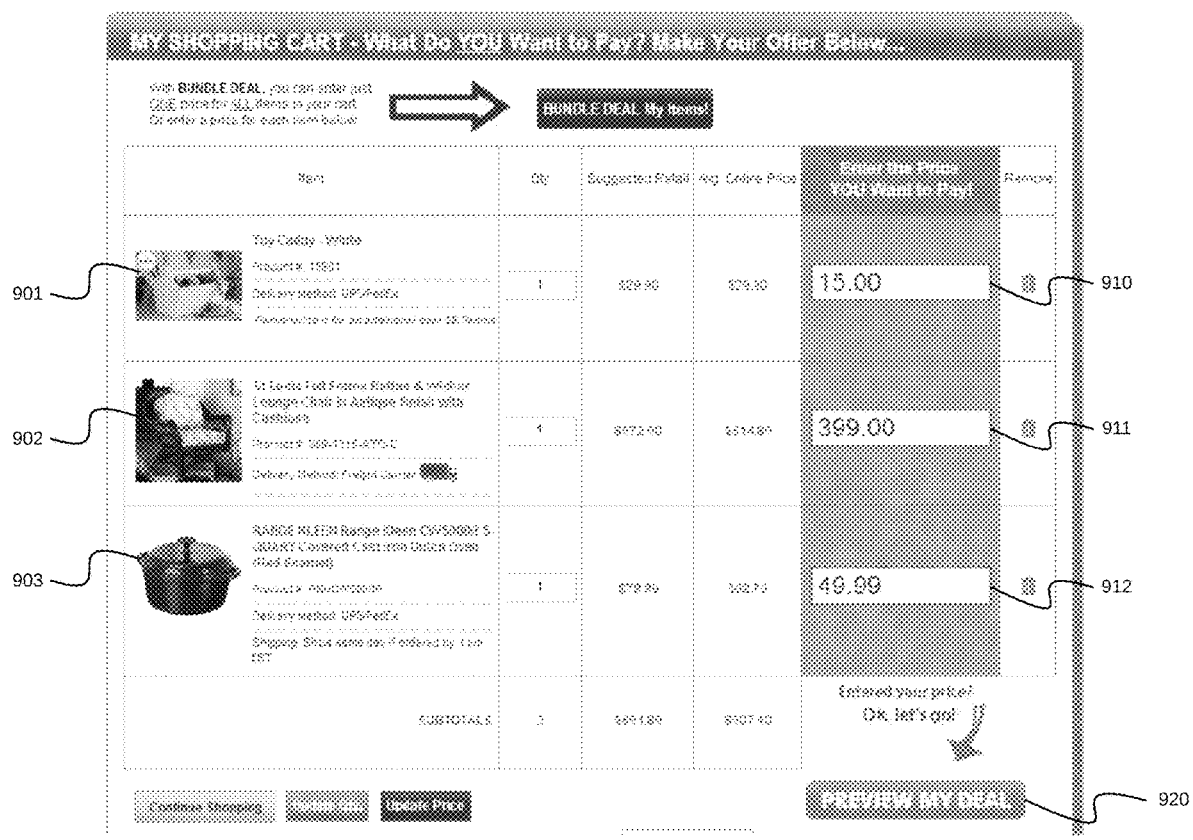
FIG. 9 is an illustration of an exemplary graphical user interface for an bundle-type shopping cart incorporating product bundles, illustrating the use of itemized price offers.

FIG. 9 is an illustration of an exemplary graphical user interface 900 for a bundle-type checkout system incorporating subscription tiers, showing the use of itemized price offers. According to the embodiment, a consumer may add a plurality of items 901, 902, 903 via first consumer device 550 to an electronic shopping cart. During a checkout process, the consumer may specify individual price offers 910, 911, 912 via first consumer device 550 for each item, indicating an offer on a per-item basis for the contents of their cart. The consumer may then preview 920 their offers via first consumer device 550, to confirm the offers and for which items the offers are being made. Upon submission to checkout system 501, each offer may be considered individually against any discount thresholds for the items involved, and each item may be individually approved or denied by offer manager 512 without affecting other items. Optionally, first consumer device 550 may be notified with an option to switch to a bundled price offer arrangement, if first consumer device 550 have any qualifying bundles in their shopping basket (as described previously).

The illustrations of FIG. 8 and FIG. 9 are for representative purposes, and one of ordinary skill in the art would appreciate that any number of GUIs and other graphical representations that may be generated by system 501, and embodiments of the present invention are contemplated for use with any GUI type or form and the generation of any such graphical representation.

Figure 10:
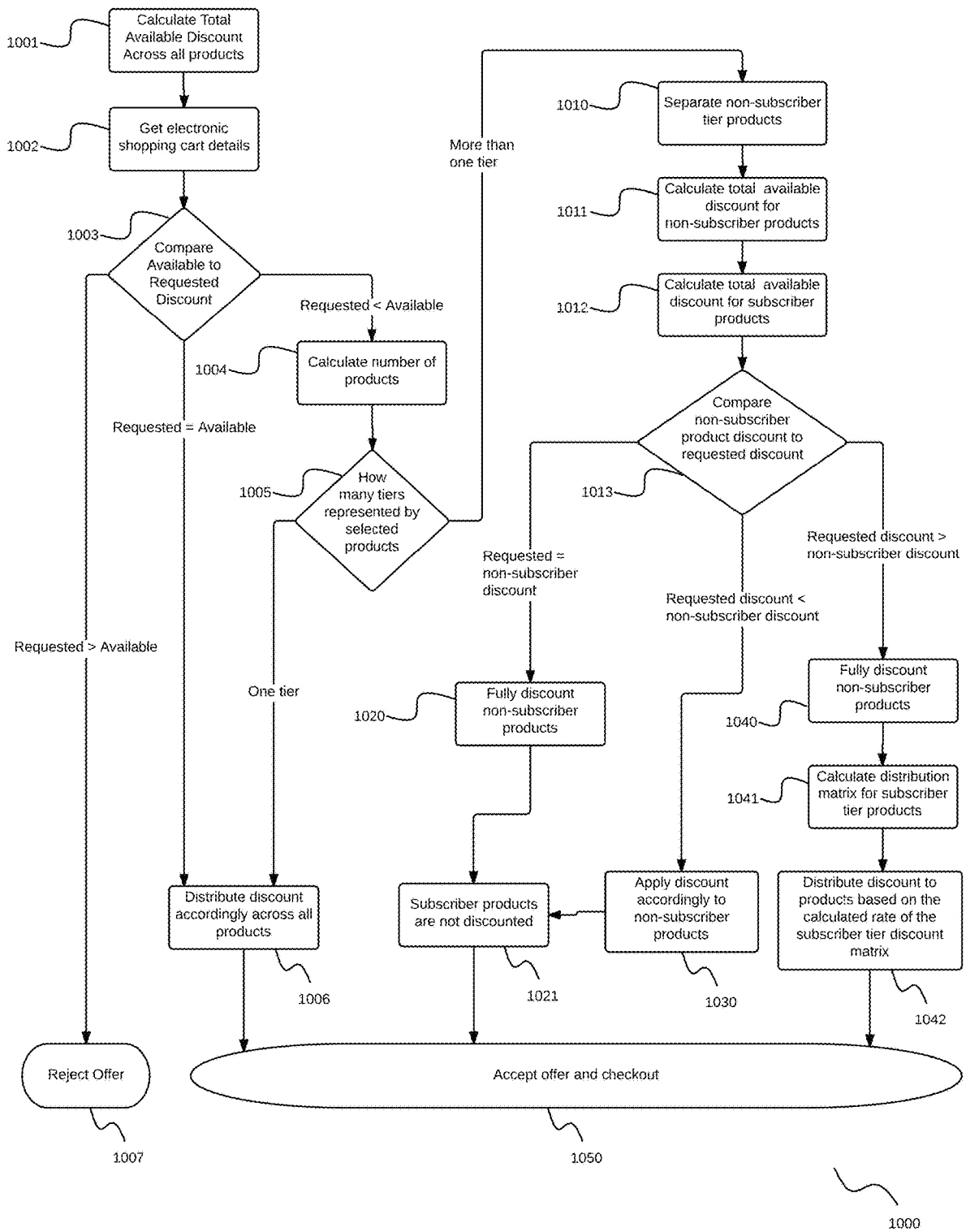
FIG. 10 is a flow diagram illustrating an exemplary method for weighted discount distribution based on subscription tier in a bundle-type checkout system incorporating subscription tiers.

FIG. 10 is a flow diagram illustrating an exemplary method for weighted discount distribution based on subscription tier level. In a preferred embodiment, a network-connected subscription tier discount distribution computer comprising at least a processor and a memory further comprising a plurality of programming instructions stored in the memory and operating on a processor, the programming instructions comprising a system to perform distribution of discounts to a plurality of consumer-selected product identifiers when purchased as a bundle is disclosed. It should be appreciated that a bundle may consist of only one product. According to the embodiment, in an initial step 1001, discount optimization manager 510 analyzes all product identifiers in an electronic shopping cart as selected by a first consumer device 550. That is, for each product identifier, discount optimization manager 510 calculates the difference between the advertised retail price and an associated pre-configured LAO price. The calculated amount is referred to as the "available discount" (that is, the total amount that a consumer may request as a discount on the bundle). Once all available discounts are calculated for each product identifier, a "total available discount" is calculated by adding the individual available discount fr each product identifier within the bundle. It should be appreciated that the plurality of product identifiers in the shopping cart may be selected by a consumer using first consumer device 550 associated to a single merchant device 551 or associated to a plurality of merchant devices 551. In a next step 1002, discount optimization manager 510 identifies product identifiers within the shopping cart as selected by first consumer device 550, receives a bundled offer from first consumer device 550, that is, a single offer price entered by the consumer via first consumer device 550 for the bundle, as, for example, described in FIG. 8.

In a next step 1003, discount optimization manager 510 calculates a "requested discount" by comparing the total retail price of all product identifiers within the bundle to the offer price by first consumer device 550. discount optimization manager 510 then calculates the difference between the requested discount and the total available discount. If the requested discount is greater than the total available discount, then the offer is rejected in a final step 1007 whereby notification of the rejected offer is sent to first consumer device 550. In some embodiments, first consumer device 550 may be prompted, via consumer interface 521, to enter a new offer for the bundle. In some embodiments, first consumer 550 may be limited in the number of offers that may be made on a particular bundle. For example, discount optimization manager 510 may limit offers to a quantity of two rejected offers. In this regard after two rejected offers, discount optimization manager 510 may disable the ability for first consumer device 550 to enter a third offer through consumer interface 521. For example, for a pre-specified amount of time, or for the current combination of product identifiers in the bundle. In another embodiment, a new LAO may be calculated for each product identifier within the bundle creating a new total LAO for the bundle as discussed previously.

Continuing with step 1003, if the requested discount is equal to the total available discount, then the discount may be applied to all the product identifiers (for example, to establish the selling price of each product identifier within the bundle at a selling price equal to the LAO price). If the requested discount is less than the total available discount, a next step 1004 calculates the number of product identifiers in the bundle. For each product identifier in the bundle, discount optimization manager 510 locates the product identifier in product database 530 to identify an associated merchant device 551 and determines a subscription tier (for example, subscription tiers representing "gold", "silver", or "bronze" tiered merchants), if any, for associated merchant as may have been previously configured through subscription manager 511. In a next step 1005, discount optimization manager 510 computes the number of subscription tiers represented by all the product identifiers within the bundle. If only one subscription tier is represented within the plurality of product identifiers in the bundle, then step 1006 distributes the requested discount proportionally across all product identifiers an even fashion. For example, if the requested discount is 10%, then 10% of the available discount for each product identifier is set as the selling price for each product identifier and an overall 10% bundle price will be presented in step 1050. As such, an accepted offer is sent to first consumer device 550 through consumer interface 521. In should be appreciated that in a preferred embodiment, individual discounts available to first consumer device 550 for the selected product identifiers are not visible to first consumer device 550; however, in another embodiment, consumer interface 521 may present product discount information for individual product identifiers to first consumer device 550.

Referring again to step 1005, if discount optimization manager 510 determines that there are more than one subscription tiers represented from the bundled product identifiers, then step 1010 removes the product identifiers associated to one or more merchant devices 551 who are identified as non-subscribers. In some embodiments, a non-subscribing merchant may still be categorized as a tier. In a next step 1011, discount optimization manager 510 calculates a "first subtotal available discount" (hereinafter referred to as "non-subscriber total discount") for product identifiers associated to the non-subscriber tier. In a next step 1012 discount optimization manager 510 calculates a "second subtotal available discount" (hereinafter referred to as "subscriber total discount") for product identifiers associated to one or more merchant devices 551 who are identified as subscribers as may have been preconfigured via subscription manager 551. The subscriber discount is calculated by subtracting the non-subscriber total discount from the requested discount.

In a next step 1013 the non-subscriber total discount is compared to the requested discount by discount optimization manager 510. If the requested discount is equal to the non-subscriber total discount, then the requested discount amount is evenly discounted from the product identifiers associated with one or more non-subscribing merchant devices 551 (that is the final sale price for the product identifiers associated with non-subscribing members will be set at the LAO). Further, no discount may be applied to product identifiers associated to merchants who have a subscription as preconfigured through subscription manager 511 (that is, the price will be set at the retail price for product identifiers associated to merchants with a subscription) in step 1021. It can be appreciated that by being a subscriber of bundle-type checkout system 501, a merchant can increase revenues in a bundled purchase scenario. Accordingly, in a next step 1050, the offer price is accepted and presented to first consumer device 550 for purchase through consumer interface 521.

Referring again to step 1013, if the requested discount is less than the non-subscriber total discount, a percentage discount is calculated by discount optimization manager 510 by dividing the requested discount by non-subscriber total discount. The product identifiers associated to the non-subscriber tier are discounted by the calculated percentage (that is the final sale price for the product identifiers associated with non-subscribing members will be set at the retail price minus the calculated percentage). Furthermore, no discount is applied to product identifiers associated to merchants who have a subscription as may have been preconfigured through subscription manager 511 (that is, the price will be set at the retail price for product identifiers associated to merchants with a subscription) in step 1021. Accordingly, in a next step 1050, the offer price is accepted and presented to first consumer device 550 to confirm a purchase through consumer interface 521.

Referring again to step 1013, based upon the requested discount being greater than the non-subscriber total discount, then, in step 1040, a final selling price is set at its respective LAO price for each product identifier associated to one or more non-subscribing merchant devices 551. Furthermore, in step 1041, a final selling price for product identifiers associated to one or more merchant devices 551, who are subscribers, is based on a weighted discount based on the respective subscription tier associated to each product identifier (that is, for product identifiers associated to merchant devices 551 that have subscribed to a particular subscription tier). It should be appreciated that a merchant who may pay for a higher-level subscription, may enjoy an automatic discount at a lower rate than merchants who pay for a lesser tier of subscription (or no subscription). In a preferred embodiment, a network-connected weighted discount distribution computer based on merchant subscription tiers, as pre-configured by subscription manager 511, comprises at least a processor and a memory, further comprising a plurality of programming instructions stored in the memory and operating on a processor, the programming instructions adapted to calculating a matrix of discount values for weighted discounts is as follows:

Variable x may be an integer that sets the number of subscription tiers. For example, x=5 represents that there are 5 subscription tiers.

Variable y is a total subscriber "total discount" value for all tier values combined. For example, y=150.50 is the value as calculated in step 1012

Variable z is the percentage increase from each subscription tier to the next subscription tier. That is the difference in discount that will be applied to each tier. For example, where z=0.25 a second merchant device 551 who may have a higher subscription tier (for example, "gold level" versus "silver level", may enjoy a 25% reduction on a discount applied to their associated product identifiers within the bundle. In a preferred embodiment, the distribution weighting is configurable by optimization manager 510 through admin console 541. In some embodiments, the percentage increase may be calculated dynamically for the particular bundle as selected by first consumer 550.

Step 1041 continues wherein in a preferred embodiment, a ComputeWeightedDitributionByTiers function computes weighted discount distribution for x number of subscription tier groups as follows:

```
function ComputeWeightedDitributionByTiers (x, y, z)
    //initialize a matrix of size x * x with zeros
    pascal_matrix[ ] = matrix(fill = 0, size = x * x)
    for i ← 1 to x do
        for j ← 1 to i do
            pascal_matrix[i, j] ← choose(i - 1, j - 1)
    sum.coefficients[ ] ← colSums(pascal_matrix)
    // solve for x1 such that x1 = y/z_sum
    z_sum ← 0
    for i ← 1 to x do
        z_sum <- z_sum + sum.coefficients [i] * z ^ (i - 1)
```

-continued

```
        x1 ← round(y ÷ z_sum, 2)
        //Compute final value of each x tier
        solution[ ] ← matrix(fill = 0, size = 1 * x)
        solution[1] ← x1
        for i ← 2 to x do
            solution[i] ← solution[i − 1] * (z + 1)
        //transform results to be percentages of y
        solution ← round (solution ÷ y, 3)
        return(solution)
```

In an exemplary embodiment where there are three subscription tiers (e.g. x=3, wherein, for example, x1 represents a "Gold" subscription tier, x2 represents a "Silver" subscription tier, and x3 represents a "Bronze" subscription tier) a distribution of discount is calculated. A discount value for distribution (that is, a total discount to be applied to subscription tiers), for example, as calculated by step 1012, may be, for example 555 (i.e. y=555, that is, the discount to be applied to the bundle of product identifiers is, for example, $555) and the rate at which subscription tiers are discounted is, for example, 45% (i.e. z=0.45, that is, each x subscription tier group is discounted at a rate of z more than the previous), and exemplary distribution of the discount as calculated by the ComputeWeightedDitributionByTiers function may be as follows:

TABLE 1

| Subscription Tier | Discount rate |
| --- | --- |
| Gold (i.e. x1) | 0.22 |
| Silver (i.e. x2) | 0.319 |
| Bronze (i.e. x3) | 0.462 |

In step 1042, distributed discounts based on the computed discount levels using the function ComputeWeightedDitributionByTiers are applied to corresponding product identifiers within the bundle of product identifiers. Accordingly, product identifiers within the bundle associated to merchants with a subscription tier corresponding to a first x value (i.e. "Gold") will be discounted at 22%, product identifiers within the bundle associated to merchants with a subscription tier corresponding to a second x value (i.e. "Silver") will be discounted at 31.9%, product identifiers within the bundle associated to merchants with a subscription tier corresponding to a third x value (i.e. "bronze") will be discounted at 46.2%. It can be appreciated by one with ordinary skill in the art that by weighting discount distribution in such a fashion may enable new sources of income for a service provider of system 501 through subscription fees, for example, by charging a different subscription fee that would generate a lesser discount on product identifiers for that merchant. In a system where a consumer may bundle product identifiers and provide a purchase offer such a system would generate increased revenue, both from increased sales by attracting consumers who may provide "offer prices" on bundled product identifiers and/or by generating a new stream of income by charging for subscriptions.

In an exemplary embodiment where there are four subscription tiers (e.g. x=4), the distribution of discount is calculated by step 1012 may be, for example 1000 (i.e. y=1000) and the rate at which subscription tiers are discounted is, for example, 25% (i.e. z=0.25), and exemplary distribution of the discount as calculated by the ComputeWeightedDitributionByTiers function would be as follows:

TABLE 2

| Subscription Tier | Discount rate |
| --- | --- |
| x1 | 0.173 |
| x2 | 0.217 |
| x3 | 0.271 |
| x4 | 0.339 |

In step 1042, distributed discounts based on the computed discount levels using the function ComputeWeightedDitributionByTiers would be applied to the bundled product identifiers based on subscription tier level. Accordingly, product identifiers within the bundle associated to merchants with a subscription tier corresponding to a first x tier will be discounted at 17.3%, product identifiers within the bundle associated to merchants with a subscription tier corresponding to a second x tier will be discounted at 21.7%, product identifiers within the bundle associated to merchants with a subscription tier corresponding to a third x tier will be discounted at 27.1%, product identifiers within the bundle associated to merchants with a subscription tier corresponding to a fourth x tier will be discounted at 33.9%.

In an exemplary embodiment where there are nine subscription tiers (e.g. x=9), the distribution of discount is calculated by step 1012 may be, for example 75 (i.e. y=75) and the rate at which subscription tiers are discounted is, for example, 10% (i.e. z=0.10), and exemplary distribution of the discount as calculated by the ComputeWeightedDitributionByTiers function would be as follows:

TABLE 3

| Subscription Tier | Discount rate |
| --- | --- |
| x1 | 0.074 |
| x2 | 0.081 |
| x3 | 0.089 |
| x4 | 0.098 |
| x5 | 0.108 |
| x6 | 0.119 |
| x7 | 0.13 |
| x8 | 0.143 |
| x9 | 0.158 |

In step 1042, distributed discounts based on the computed discount levels using the function ComputeWeightedDitributionByTiers would be applied to the bundled product identifiers based on subscription tier level. Accordingly, product identifiers within the bundle associated to merchants with a subscription tier corresponding to a first x tier will be discounted at 7.4%, product identifiers within the bundle associated to merchants with a subscription tier corresponding to a second x tier will be discounted at 8.1%, product identifiers within the bundle associated to merchants with a subscription tier corresponding to a third x tier will be discounted at 8.9%, product identifiers within the bundle associated to merchants with a subscription tier corresponding to a fourth x tier will be discounted at 9.8%, product identifiers within the bundle associated to merchants with a subscription tier corresponding to a fifth x tier will be discounted at 10.8%, product identifiers within the bundle associated to merchants with a subscription tier corresponding to a sixth x tier will be discounted at 11.9%, product identifiers within the bundle associated to merchants with a subscription tier corresponding to a seventh x tier will be discounted at 13%, product identifiers within the bundle associated to merchants with a subscription tier corresponding to a eighth x tier will be discounted at 14.3%, product identifiers within the bundle associated to merchants with a subscription tier corresponding to a ninth x tier will be discounted at 15.8%. It can should be appreciated by one with ordinary skill in the art, that any number of subscription tiers may be computed to satisfy varying business needs. For example, in a scenario where there are high volume sales, a more granular distribution may provide a better arrangement from a business perspective.

In a final step 1050, the offer price is accepted and presented to first consumer device 550 for purchase confirmation through consumer interface 521.

In some embodiments, analytics engine 522 may calculate a dynamic subscription price based on historical revenue performance from historical database 532. That is, a customized subscription price may be computed for a given merchant to calculate what a potential revenue figure may have been had the merchant been at a particular subscription tier level, for example, to entice the merchant to, for example, sign up for a subscription (if the merchant was a non-subscriber), or to upsell the merchant to a higher subscription tier (if the merchant was already a subscriber). In this regard, the dynamic subscription price may be proportional to the computed savings for the merchant based on an "what-if" scenario if previous product identifiers (sold by the merchant) had been discounted at each available subscription tier. In some embodiments, analytics engine 522 may propose new subscription tiers the maximize profit (for example, from subscription revenues) for the operator of system 501 and/or for the merchant.

The skilled person will be aware of a range of possible modifications of the various embodiments described above. Accordingly, the present invention is defined by the claims and their equivalents.

What is claimed is:

1. A system for computing a discount matrix based on a plurality of subscription values and a bundled offer comprising:
   a network-connected bundle-type checkout computer comprising a plurality of programming instructions stored in a memory and operating on a processor, the programming instructions when executed by the processor cause the processor to:
   receive, from a consumer device, a plurality of selected product identifiers corresponding to a subset of a plurality of product;
   receive a price offer value for a bundle wherein the bundle comprises the selected product identifiers;
   calculate a total available discount for the bundle based at least in part on a plurality of least acceptable offer values and the corresponding retail price associated to each product identifier in the bundle;
   calculate a requested discount for the bundle based at least in part on a total retail bundle price for the bundle and the price offer value, wherein the total retail price for the bundle is the sum of the corresponding retail price associated to each product identifier in the bundle;
   calculate a weighted discount matrix based upon the requested discount being less than the available discount wherein the matrix holds a plurality of weighted discount values based at least in part on a plurality of subscription values, wherein each weighted discount value corresponds to a subscription value;
   assign a weighted discount value, from the plurality of weighted discount values, for each product identifier within the bundle, wherein the weighted discount value corresponds to an associated subscription tier for each merchant user device associated to each product identifier within the bundle;
   calculate a final price for the bundle; and,
   calculate a sale price for each product identifier within the bundle based at least in part on the weighted discount value;
   wherein the weighted discount values of the weighted discount matrix are calculated at least in part using a pre-defined number of subscription tiers, the requested discount, and a pre-configured offset value;
   wherein the weighted discount matrix is calculated recursively by calculating a plurality of coefficients wherein each coefficient corresponds to each subscription tier, the coefficients offset by the pre-configured offset value;
   wherein the discount optimization manager sends the sale price for each product identifier to an associated merchant user device of the plurality of merchant user devices, the associated merchant user device based on the corresponding merchant device identifier.

2. The system of claim 1, wherein a plurality of discount percentage values is calculated for each subscription tier and stored in the weighted discount matrix.

3. The system of claim 2, wherein the final sale price is calculated for a first product identifier within the bundle based on a first corresponding discount percentage value associated to a first merchant user device corresponding to the first product identifier.

4. The system of claim 1, wherein the programming instructions when executed by the processor further cause the processor to send a notification to the consumer device that the price offer value has been rejected based upon the requested discount being more than the available discount.

5. The system of claim 1, wherein the discount matrix is calculated with a plurality of equal discount values based upon the requested discount being equal to the available discount.

6. The system of claim 1, wherein the discount matrix is calculated with a plurality of equal discount values based upon the requested discount being less than the available discount and the bundle comprising a plurality of product identifiers associated to one subscription tier.

7. The system of claim 1, wherein the pre-configured offset value is calculated dynamically based at least in part on the plurality of subscription tiers.

8. The system of claim 1, wherein the least acceptable offer value is calculated dynamically for each product identifier.

9. A computer-implemented method for computing a discount matrix based on a plurality of subscription values and a bundled offer, the method comprising the steps of:
   receiving, at an offer manager, a plurality of selected product identifiers corresponding to a subset of a plurality of product;
   receiving a price offer value for a bundle from a consumer device, the bundle comprising the plurality of selected product identifiers;
   calculating, at a discount optimization manager, a total available discount for the bundle based at least in part on a plurality of least acceptable offer values and a corresponding retail price associated to each product identifier in the bundle;
   calculating, at a discount optimization manager, a requested discount for the bundle based at least in part on a total retail bundle price for the bundle and the price offer value, wherein the total retail price for the bundle is the sum of the corresponding retail price associated to each product identifier in the bundle;

calculating, at a discount optimization manager, a weighted discount matrix based upon the requested discount being less than the available discount wherein the matrix holds a plurality of weighted discount values based at least in part on a plurality of subscription values, wherein each weighted discount value corresponds to a subscription value;

assigning, at a discount optimization manager, a weighted discount value, from the plurality of weighted discount values, for each product identifier within the bundle, wherein the weighted discount value corresponds to an associated subscription tier for each merchant user device associated to each product identifier within the bundle;

calculating, at a discount optimization manager, a final price for the bundle; and, calculating, at a discount optimization manager, a sale price for each product identifier within the bundle based at least in part on the weighted discount value;

wherein the weighted discount values of the weighted discount matrix are calculated at least in part using a pre-defined number of subscription tiers, the requested discount, and a pre-configured offset value;

wherein the weighted discount matrix is calculated recursively by calculating a plurality of coefficients wherein each coefficient corresponds to each subscription tier, the coefficients offset by the pre-configured offset value;

wherein the discount optimization manager sends the sale price for each product identifier to an associated merchant user device of the plurality of merchant user devices, the associated merchant user device based on the corresponding merchant device identifier.

10. The method of claim 9, wherein a plurality of discount percentage values is calculated for each subscription tier and stored in the weighted discount matrix.

11. The method of claim 10, wherein the final sale price is calculated for a first product identifier within the bundle based on a first corresponding discount percentage associated to a first merchant user device corresponding to the first product identifier.

12. The method of claim 9, wherein the discount optimization manager sends a notification to the consumer device that the price offer value has been rejected based upon the requested discount being more than the available discount.

13. The method of claim 9, wherein the discount matrix is calculated with a plurality of equal discount values based upon the requested discount being equal to the available discount.

14. The method of claim 9, wherein the discount matrix is calculated with a plurality of equal discount values based upon the requested discount being less than the available discount and the bundle comprising a plurality of product identifiers associated to one subscription tier.

15. The method of claim 9, wherein the pre-configured offset value is calculated dynamically based at least in part on the plurality of subscription tiers.

16. The system of claim 9, wherein the least acceptable offer value is calculated dynamically for each product identifier.

* * * * *